(12) United States Patent
Kolbenschlag

(10) Patent No.: US 9,285,056 B2
(45) Date of Patent: Mar. 15, 2016

(54) ELECTROPNEUMATIC FIELD DEVICE

(75) Inventor: Stefan Kolbenschlag, Darmstadt (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 798 days.

(21) Appl. No.: 13/327,990

(22) Filed: Dec. 16, 2011

(65) Prior Publication Data

US 2012/0153633 A1 Jun. 21, 2012

(30) Foreign Application Priority Data

Dec. 17, 2010 (DE) .......................... 10 2010 054 878

(51) Int. Cl.
| | |
|---|---|
| F02B 63/04 | (2006.01) |
| H02K 7/18 | (2006.01) |
| H02K 35/00 | (2006.01) |
| F16K 37/00 | (2006.01) |
| H02K 35/02 | (2006.01) |

(52) U.S. Cl.
CPC ......... *F16K 37/0033* (2013.01); *F16K 37/0041* (2013.01); *H02K 7/1884* (2013.01); *H02K 35/02* (2013.01)

(58) Field of Classification Search
CPC ....... H02K 35/02; H02K 7/18; H02K 7/1876; B24B 49/105; F21L 13/06; H04B 1/04; H04B 1/1607; F16K 37/00; F03B 11/004; F03B 13/24
USPC .......... 290/1 A; 362/192, 205; 455/127.1, 91; 322/3
See application file for complete search history.

(56) References Cited

U.S. PATENT DOCUMENTS

| | | | | |
|---|---|---|---|---|
| 1,701,366 | A | * | 2/1929 | Herr et al. ...................... 290/4 C |
| 1,701,371 | A | * | 2/1929 | Herr et al. ...................... 290/1 A |
| 4,249,096 | A | * | 2/1981 | Hickox ........................... 310/15 |
| 5,267,129 | A | * | 11/1993 | Anderson ....................... 362/96 |
| 5,893,343 | A | * | 4/1999 | Rigazzi ........................ 123/46 E |
| 6,119,457 | A | * | 9/2000 | Kawamura ..................... 60/618 |
| 6,220,719 | B1 | | 4/2001 | Vetorino et al. |
| 6,784,566 | B2 | * | 8/2004 | Thomas .......................... 290/55 |
| 7,757,503 | B2 | * | 7/2010 | Taylor ............................ 62/172 |
| 2003/0143963 | A1 | | 7/2003 | Pistor et al. |
| 2003/0155771 | A1 | | 8/2003 | Cheung et al. |
| 2004/0155467 | A1 | * | 8/2004 | Cheung et al. ................ 290/1 R |

(Continued)

FOREIGN PATENT DOCUMENTS

| | | |
|---|---|---|
| DE | 10311567 B3 | 11/2004 |
| DE | 10 2004 004 930 A1 | 8/2005 |

(Continued)

*Primary Examiner* — Tulsidas C Patel
*Assistant Examiner* — Charles Reid, Jr.
(74) *Attorney, Agent, or Firm* — Schiff Hardin LLP

(57) ABSTRACT

In an electropneumatic field device for controlling a pneumatic actuator, an energy converter converts pneumatic energy of a pneumatic power supply of the actuator into electrical energy. An oscillating permanent magnet receives a compressed air pulse to perform a forward motion. A return device transmits a return force to the oscillating permanent magnet for performing a return motion opposite to the forward motion. An electrical voltage is induced into a coil of the energy converter by the forward and return motions of the oscillating permanent magnet. The return device is designed to generate a magnetic field that is polarized with respect to the oscillating permanent magnet such that a magnetic repulsion return force induces the return motion.

12 Claims, 4 Drawing Sheets

(56) References Cited

U.S. PATENT DOCUMENTS

| | | | |
|---|---|---|---|
| 2004/0164626 A1* | 8/2004 | Cheung et al. | 310/30 |
| 2004/0251750 A1* | 12/2004 | Cheung et al. | 310/23 |
| 2005/0035600 A1* | 2/2005 | Albsmeier et al. | 290/1 E |
| 2006/0017289 A1* | 1/2006 | Bodkin | 290/1 A |
| 2009/0090880 A1* | 4/2009 | Dolenti et al. | 251/129.03 |
| 2011/0000206 A1* | 1/2011 | Aprad | 60/517 |
| 2011/0187124 A1 | 8/2011 | Milinkovic | |
| 2011/0287727 A1 | 11/2011 | Pistor et al. | |
| 2012/0286521 A1* | 11/2012 | Mayor | 290/1 A |

FOREIGN PATENT DOCUMENTS

| | | |
|---|---|---|
| DE | 10 2004 043 002 A1 | 9/2006 |
| DE | 10 2006 011 503 A1 | 9/2007 |
| WO | 01/91315 A2 | 11/2001 |
| WO | 0233811 A1 | 4/2002 |
| WO | 2009/146718 A1 | 12/2009 |
| WO | 2009/152623 A1 | 12/2009 |
| WO | 2010124075 A2 | 10/2010 |
| WO | WO 2010124075 A2 * | 10/2010 |

\* cited by examiner

ELECTROPNEUMATIC FIELD DEVICE

BACKGROUND

The disclosure relates to an electropneumatic field device for controlling a pneumatic actuator that is usually used to adjust a process fluid stream of a technical processing installation like a refinery, a chemical plant, etc. or an installation for manufacturing automation. The disclosure also relates to a method for converting pneumatic energy of an electropneumatic field device into electrical energy.

Today, electropneumatic field devices may have microprocessors and storage elements. Furthermore, additional sensors like a temperature or pressure sensor are often used. In particular, positioners often perform complex calculations: the input and output signals are modified by calculations, complex control algorithms are used, diagnosing parameters are determined and valve movements are captured and stored in order to exactly control a valve position. As opposed to this, IP-converters receive a control current and generate a control pressure signal. Compared to a positioner they lack the feedback of the valve position. A feedback of the pressure signal of IP-converters for the purpose of a more precise control is known but so far is not common in the market.

Electropneumatic field devices are often used in environments exposed to a risk of explosion and therefore mostly use only small amounts of electrical power. Besides, positioners typically need to provide an emergency position to be adopted in case of a power failure. Pneumatic positioners with a spring for storing energy provide a simple, reliable, fast and inexpensive way to realize the emergency position. Field devices with a pneumatic output are therefore common as electrical actuating devices.

In modern applications, a so-called two wire field device is used that receives both electric power and electrical control parameters via two wires. Control information can be transmitted bidirectionally by means of digital protocols, for which field protocols like HART, Profibus or Foundation Fieldbus are used.

Within the domain of electropneumatic field devices, especially of positioners, there is a tendency to increase the functionality of the device with respect to control, monitoring and diagnosis by using further microelectronic components and respective sensors. During the development of such components, it became apparent that the typically available electric power is not or is barely sufficient for devices of higher intelligence and extended functionality, or else a high amount of development effort and investment is required in order to provide the desired sufficient electric power.

Furthermore, in the technical domain of electropneumatic field devices, the tendency can be observed that the communication between control components is realized for example by wireless transmission and a cable connection for power supply is dispensed with. Such a field device without a power supply line requires local energy storage media like batteries, which however have a limited lifetime and thus require safety monitoring.

DE 10 2006 011 503 A1 deals with the above named problem of an insufficient available electric power for the electronic components of electropneumatic field devices. From this publication a valve positioner for pneumatically operated valves of a process automation installation is known. The electropneumatic positioner, which is connected to a pneumatic actuator, comprises an energy converter designed to provide electric power from the compressed air supply stream. The energy converter can be designed with a piezoelement, a plunger coil, or a thermoelement. It became apparent that the known energy conversion systems are only partially applicable in the domain of process technology and/or manufacture automation because the energy provided does not suffice, and the mechanical effort as well as the investment is high for such systems.

An energy conversion unit is generally known from DE 10 2004 04930 A1 in which an oscillating permanent magnet performs a back and forth oscillation by means of a compressed air impulse, wherein the movement of the permanent magnet induces electrical energy in a coil. A compression spring is providing the return force that acts against the pressure impulse. It became apparent that also when using this kind of system the efficiency is insufficiently low. The use of the known energy conversion unit is difficult in process technology and/or manufacture automation, resulting especially to the fact that the mechanical return compression spring as well as the pressure impulse generator must be tuned to each other.

SUMMARY

It is an object to overcome the disadvantages of the state of the art, in particular to provide an electric power supply for extended functionality of pneumatic field devices in process technology and/or manufacture automation. Therein the mechanical manufacturing effort should be maintained as low as possible.

In an electropneumatic field device for controlling a pneumatic actuator, an energy converter converts pneumatic energy of a pneumatic power supply of the actuator into electrical energy. An oscillating permanent magnet receives a compressed air pulse to perform a forward motion. A return device transmits a return force to the oscillating permanent magnet for performing a return motion opposite to the forward motion. An electrical voltage is induced into a coil of the energy converter by the forward and return motions of the oscillating permanent magnet. The return device is designed to generate a magnetic field that is polarized with respect to the oscillating permanent magnet such that a magnetic repulsion return force induces the return motion.

DESCRIPTION OF PREFERRED EXEMPLARY EMBODIMENTS

Figure 1:
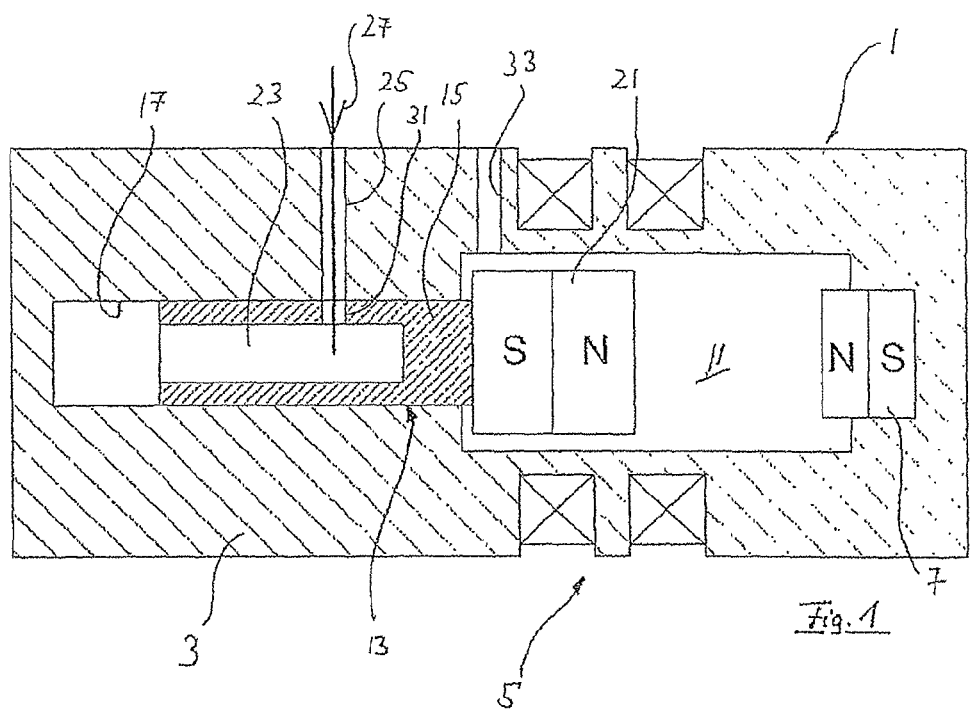
FIG. 1 is a schematic cross-sectional view of an energy converter for an electropneumatic field device according to an exemplary embodiment in a pressure pulse operating state.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated exemplary embodiments and such further applications of the principles of the invention as illustrated as would normally occur to one skilled in the art to which the invention relates are included.

Accordingly, an electropneumatic device like an electropneumatic shift valve or an electropneumatic positioner for controlling a pneumatic actuator is provided. The electropneumatic field device that may also comprise the pneumatic actuator as well as the control valve connected to it, has an energy converter converting pneumatic energy, in particular of the pneumatic power supply of the actuator, into electric energy. The energy converter has an oscillating permanent magnet that receives a compressed air pulse to perform a forward motion. The compressed air pulse causes the oscillating permanent magnet to accelerate in a first direction. Furthermore, the energy converter has a return device transmitting a return force to the oscillating permanent magnet for performing a return motion opposite to the forward motion. During transmission of the compressed air pulse the return force of the return device may continuously act on the oscillating permanent magnet. However, at the beginning of the forward motion the forward force exerted by the compressed air pulse is larger than the return force. Only when the compressed air pulse decreases or disappears does the return acceleration of the return device dominate and initiate the return motion. The forward and return motion of the oscillating permanent magnet with respect to the coil of the energy converter causes electric energy to be induced within the coil of the energy converter. Therein the coil may be integrated inside or outside the housing and at least partially surrounds the motion path of the oscillating permanent magnet moving back and forth. According to the preferred embodiment, the return device is designed to generate a magnetic field, the polarity of which is such that a magnetic repulsion force initiates the return motion. The magnetic field may act continuously or be switched on according to an electrical control algorithm.

Surprisingly, it was found that with of the arrangement of a magnetic field for generating a return force, a regular and lasting back and forth motion can be achieved relatively simply in order to induce electric energy within the coil suitable for supplying electrical components of the electropneumatic field device. The investment required for installing the magnetic field is small, as are the design modifications for realizing the magnetic field. It shall be understood that the magnetic field may be realized electro-magnetically or be a permanent magnetic field. With the coordinated timing of the pneumatic pressure pulse and a magnetic return force according to the preferred embodiment, it is possible to create a powerful energy converter for a pneumatically driven field device without having to achieve precise tolerances during manufacturing in order to obtain guidance for the actuator piston or the oscillating permanent magnet with very low friction.

In a preferred exemplary embodiment, the return device is a permanent magnet stationary in particular with respect to the coil of the energy converter. In order to produce the desired return force, equal poles of the oscillating permanent magnet and the return magnet are facing each other. For the exemplary embodiment with a permanent magnet as a return magnet, the timing for the back and forth movement of an oscillating permanent magnet is realized by means of a timed increase and decrease of the pneumatic pulse. Alternatively, an electromagnet may be used as a magnetic return device, the electro magnet being timed respectively in order to realize the back and forth movement of the oscillating permanent magnet. In this alternative embodiment, a continuous pressure pulse may be fed to the chamber. However, the embodiment with a permanent magnet is preferred as less electric power is required for this design.

In a further development of an exemplary embodiment, the oscillating permanent magnet or an actuating piston holding the oscillating permanent magnet is guided in a cavity of a housing of the energy converter in particular by means of a slide bearing in order to perform a translational forward and backward movement. The direction as well as the amplitude of the movement can be adjusted such that the oscillating permanent magnet can plunge into and out of the coil in order to induce electric energy.

In a further development, the energy converter has an actuating piston at which the oscillating permanent magnet is firmly attached. Preferably, the oscillating permanent magnet is attached at one of the ends of the actuating piston. Preferably, the actuating piston is mounted inside a cylinder guide. The cylinder guide can be formed inside the housing and delimited by the housing wall of the energy converter. Preferably, an air supply duct may lead into the cylinder guide, via which duct compressed air can be supplied for generating the compressed air pulse, and which duct is formed within the housing wall. The actuating piston and the cylinder guide delimit a pneumatic pressure chamber of the energy converter that is hermetically sealed for a compressed air pulse generation or vented towards the atmosphere, depending on the position of the oscillating permanent magnet. When the pressure chambers are sealed, the compressed air pulse is generated. When the pressure chamber is vented, the return force of the magnetic field dominates and the oscillating permanent magnet is moved into the default position.

In a preferred exemplary embodiment, an air supply duct stationary with respect to the housing of the energy converter is formed in particular inside the housing wall. The air supply duct leads up to the pressure chamber of the energy converter. The stationary air supply duct can be blocked by the oscillating permanent magnet or by an actuating piston for generating the compressed air pulse, or the duct can be opened for decreasing the pressure in the pressure chamber. Preferably, a movable supply air duct can be formed in the oscillating permanent magnet or in the actuating piston, which duct partially overlaps with the air supply duct in a pulse position for transmitting the air pressure impulse into the pressure chamber. Additionally, a movable exhaust air duct can be formed in the oscillating permanent magnet or in the actuating piston, the duct providing a fluid connection between the pressure chamber and the atmosphere, in particular a venting chamber when the piston is in an end position for pressure reduction. The venting chamber is also delimited by the housing of the energy converter. Preferably, the oscillating permanent magnet can be in the venting chamber during its back and forth movement. The venting chamber is preferably surrounded partially by the coil.

In a preferred exemplary embodiment the air supply and the air exhaust duct are realized by the same wall orifice in the permanent magnet or in the actuating piston as a functional unit.

In a further embodiment, the compressed air supply into the pressure chamber is controlled by an electropneumatic valve as a pressure controller, in particular by a 2/2-way valve. The oscillation of the piston is a forced oscillation controlled by the output of the 2/2-way valve.

In a further embodiment, the compressed air supply into the pressure chamber is controlled by an electropneumatic valve, in particular a 3/2-way valve. In this case, the oscillating piston and/or the oscillating permanent magnet can be designed without the above named supply and exhaust air duct because venting is realized by the 3/2-way valve.

In a preferred embodiment, a pressure controller is provided for the pneumatic supply of the energy converter. The pressure controller maintains the supply air pressure constant so that the oscillation of the piston is maintained. Since the supply pressure and the dimensions of the pneumatic duct influence the mechanical resonance frequency, it is important to maintain the supply pressure constant if the oscillating conditions are to be maintained constant.

In a preferred embodiment, the coil has an electric contact for collecting the generated electric induction energy. An electronic circuit is provided at the electric contact for controlling the received electric power and/or the electric power to be dispensed to the load. Preferably the power control circuit is connected to an electric storage unit like a capacitor. Therein, the power control circuit is configured such that in case of an electric power larger than the actual consumption of the electric load, the dispensed excess electric power is loaded into the storage unit.

In a preferred embodiment, the power control circuit is preceded by an equalizer converting the induced alternating current into a direct current. Alternatively, or in combination, the storage unit may be connected to a voltage controller for extracting electric energy. The voltage controller controls a supply voltage of the storage unit in particular for driving a load, preferably the field device.

In a preferred embodiment, an electric control unit is connected to an electric connection of the coil and/or the power control circuitry. The control unit provides in particular a power supply for an electropneumatic valve in connection with the pressure chamber, in particular an electropneumatic 2/2-way valve or 3/2-way valve. Preferably, the control unit is designed such that the pressure pulse for the oscillating permanent magnet is operationally timed, in particular adjusted.

In a preferred embodiment, the field device has a positioner that is controlled by a pneumatic actuator, in particular a pivoting actuator. The positioner has a sensor for capturing the position of the control valve controlled by the actuator. The actuator is connected to the sensor such that the control valve is adjusted for a corresponding fluid stream of the industrial processing installation.

Furthermore, the exemplary embodiment relates to a method for providing an electric power supply for an electropneumatic field device like an electropneumatic control valve or an electropneumatic positioner. For the method, pneumatic energy of a pneumatic power supply is converted into electric energy. For this purpose, an oscillating permanent magnet is provided that is set into a forward motion by means of a compressed air pulse. According to the preferred embodiment, the return movement of the oscillating permanent magnet is realized by means of magnetic repulsion forces.

It shall be understood that the method according to the exemplary embodiment may proceed according to the functionality of the electropneumatic field device according to the exemplary embodiment.

Further exemplary embodiments are disclosed hereafter.

Further characteristics, advantages and features of the exemplary embodiments are explained in conjunction with the drawing figures.

In FIG. 1 the energy converter of the electropneumatic field device according to the exemplary embodiment is generally given the reference numeral 1. The energy converter 1 essentially is comprised of four main components, that is a cylinder housing 3, an induction coil arrangement 5 integrated in the cylinder housing 3 and a return permanent magnet 7 that is disposed at the end of a venting chamber 11 formed in the end of the cylinder housing 3. The north pole N of the return permanent magnet 7 is facing towards the venting chamber. The return magnet 7 is disposed opposite a piston device 13 that comprises a piston glider 15 mounted movably back and forth inside the cylinder housing 3 designed as a cylindrical pressure chamber 17 while creating fluid-tight gliding surfaces. At the end of the piston glider 15 protruding into the venting chamber 11 a permanent magnet 21 is disposed, the north pole of which is facing the north pole of the return magnet 7.

The piston glider 15, the outer shape of which is cylindrical, has a hollow space 23 in the shape of a blind hole that is open towards the compressed air chamber. An air supply duct 25 is formed in a wall of the cylinder housing 3, wherein a compressed air source represented by the arrow 27 in FIG. 1, is connected to the air supply duct. A supply and exhaust air passage 31 is machined into the wall of the piston glider 15 and leads up to the hollow space 23. When the air supply duct 25 is aligned with the passage 31, air pressure is generated inside the pressure chamber 17 causing displacement of the piston device 13 towards the right in the drawing.

Figure 2:
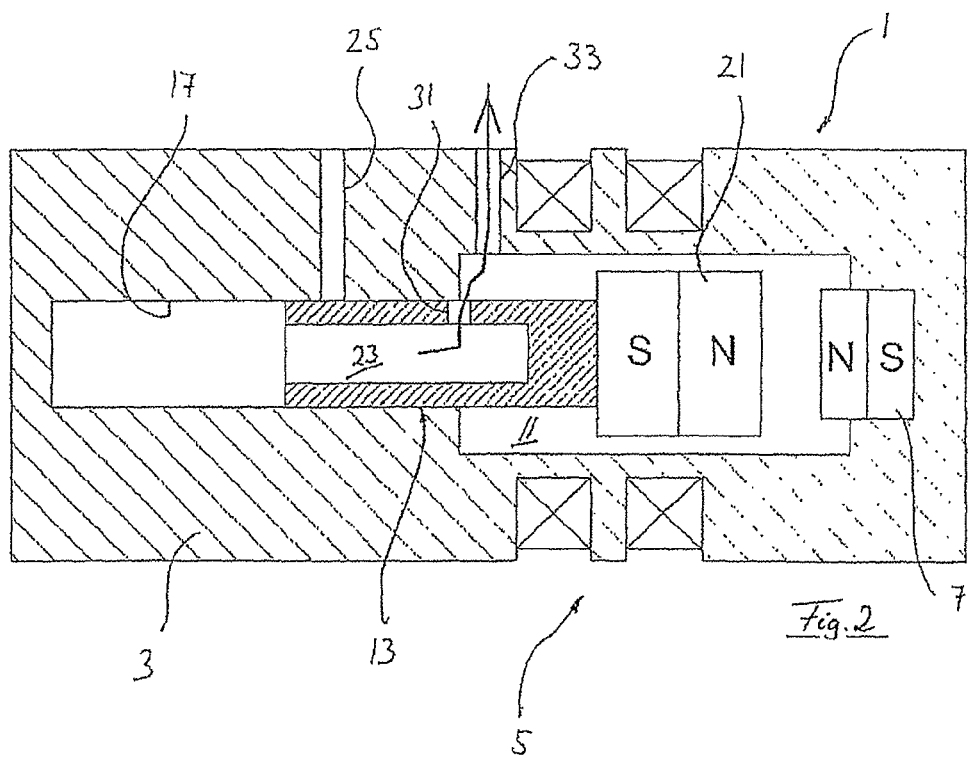
FIG. 2 is a cross-sectional view of the energy converter according to FIG. 1 in a vented operating state.
Figure 3:
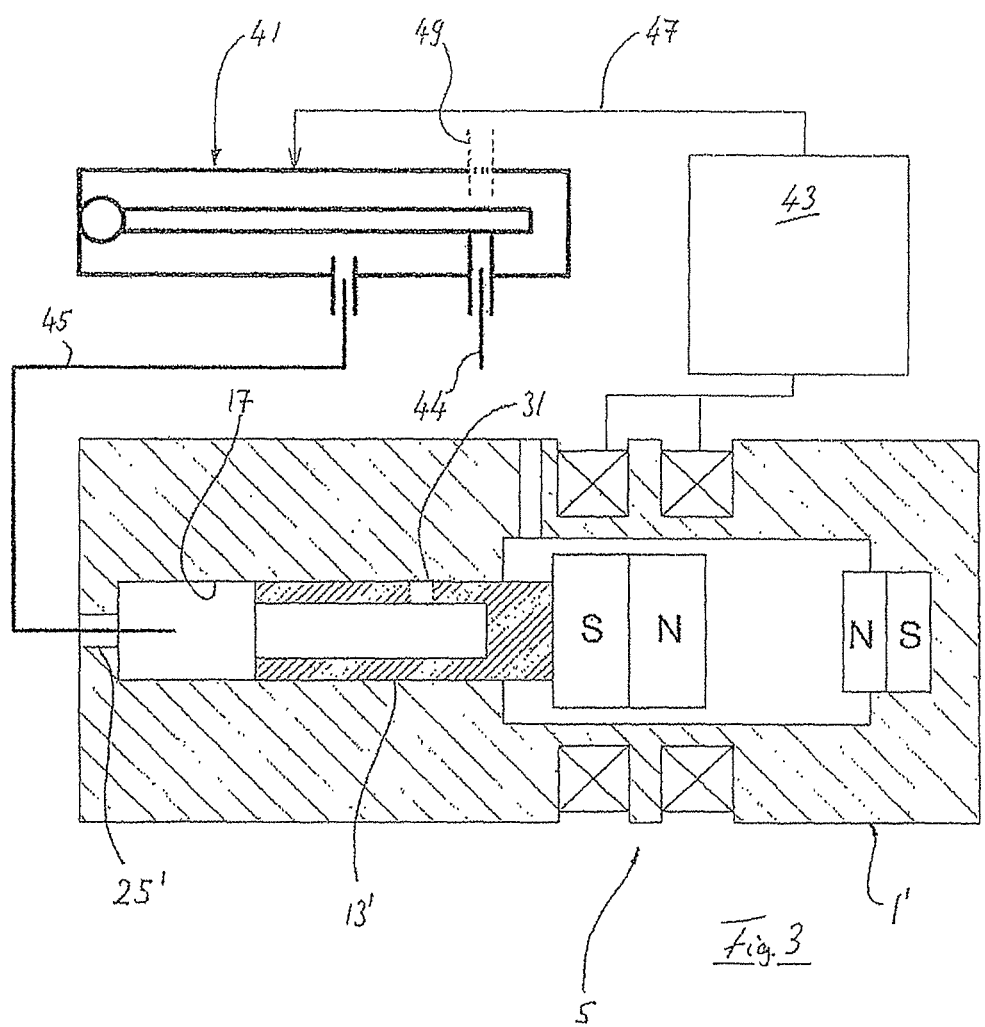
FIG. 3 is a schematic cross-sectional view of an electropneumatic field device according to an exemplary embodiment, wherein the energy converter according to FIGS. 1 and 2 is connected to an electrical control unit that controls an electropneumatic valve for generating the compressed air pulse.
Figure 4:
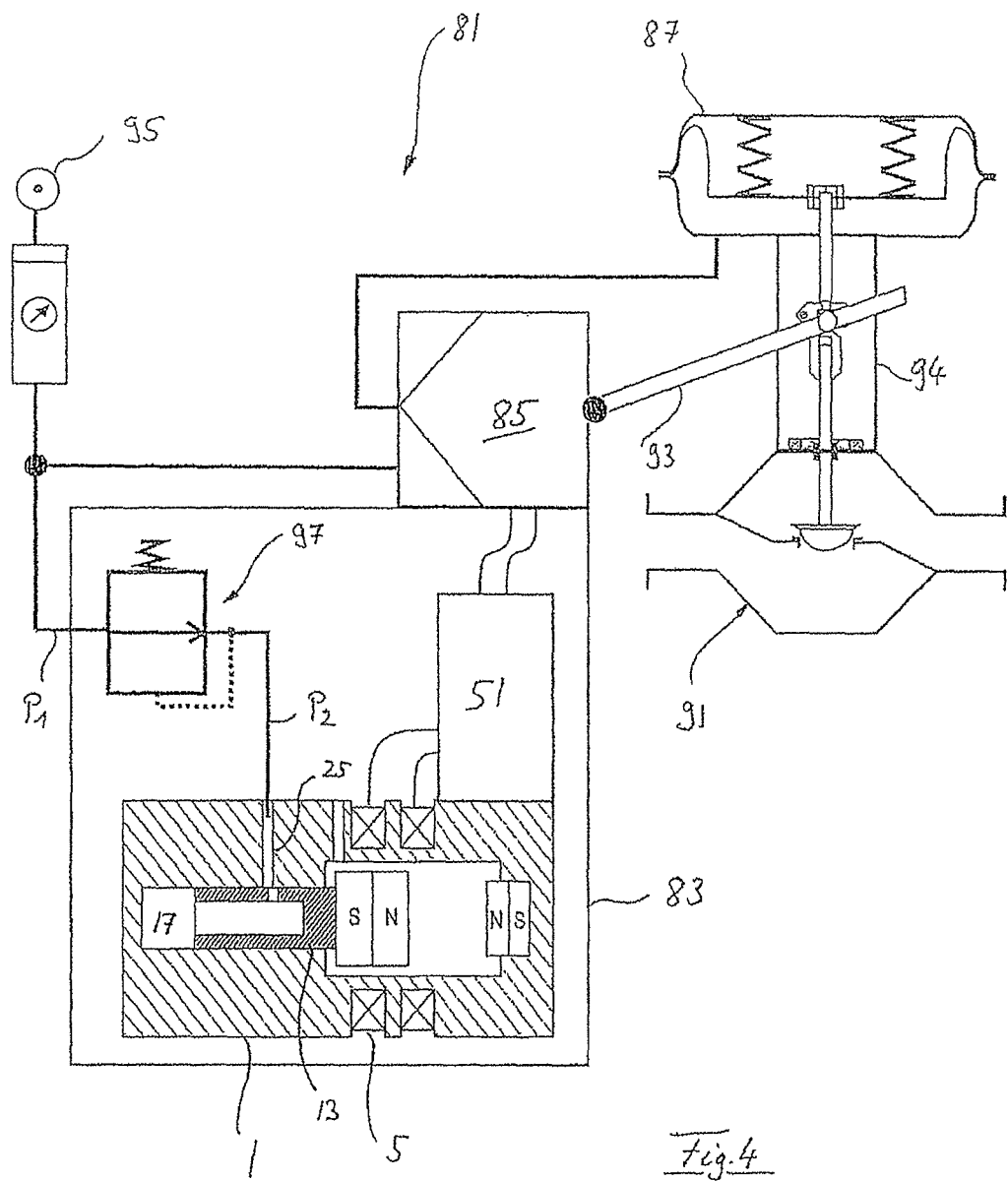
FIG. 4 is a schematic sketch of the electropneumatic field device according to the exemplary embodiment with an electropneumatic positioner, an electropneumatic actuator as well as a control valve of an industrial processing plant.
Figure 5:
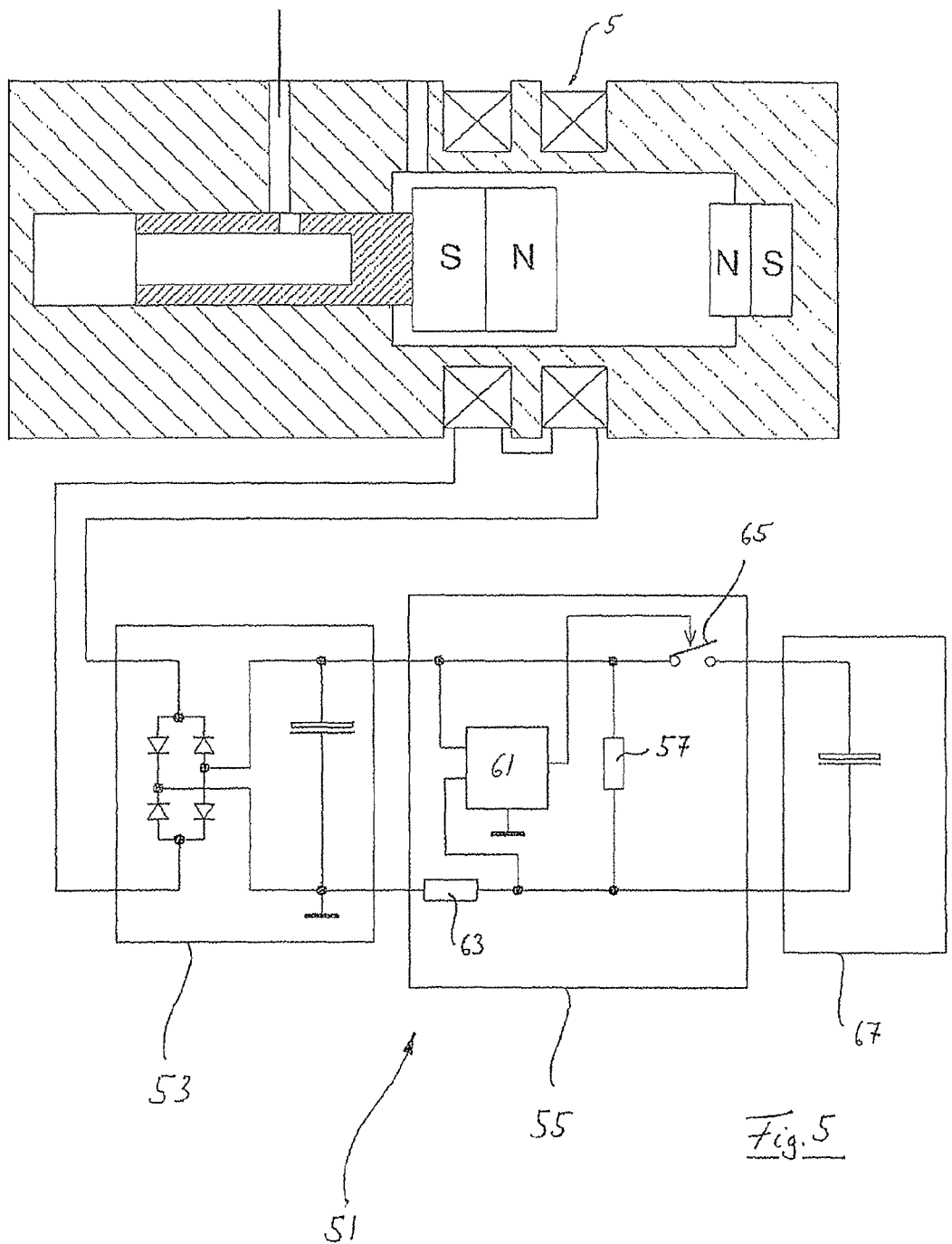
FIG. 5 is a schematic cross-sectional view of the energy converter according to FIGS. 1 and 2 connected to circuitry for controlling the induced electric power in view of a load.

Such a displacement towards the right is represented in FIG. 2 essentially in an end position of the first movement in one direction of the piston device 13. As apparent furthermore from FIG. 2, at least a portion of the air supply/air exhaust passage 31 of the piston glider 15 overlaps with the venting chamber 11 whereby the excess pressure in the compressed air pressure chamber 17 is decreased. The venting chamber 11 disposes of a venting duct 33 formed in the cylinder housing 3. With the increased air pressure being absent in the compressed air pressure chamber 17, the repulsion forces acting between the permanent magnets 7, 21 cause a return displacement of the piston device 13 towards the left according to the representation in the figure, whereby the overlap between the air supply/air exhaust passage 31 and the venting chamber 11 disappears and a renewed air pressure increase can be realized via the air supply duct 25. For a respective air pressure fed to the pressure chamber 17, which pressure is adjusted to the repulsion forces acting between the permanent magnets 7, 21, the energy converter realizes a back and forth movement of the piston device 13 including the permanent magnet 21. Thereby, an electric current is induced within the coil arrangement 5 and is fed towards an electrical circuitry 43, 51, as represented in FIG. 3, 4 or 5. It shall be understood that instead of the stationary permanent magnet 7 also other devices may be used for generating a magnetic return force, for example an electromagnet. In FIGS. 1 and 2 the coil arrangement 5 is realized by two coils connected in parallel; it shall be understood that also a single coil or more than two coils or coils connected in series may be used. The number of coils may depend on the amplitude of the back and fro movement of the piston device 13.

In FIGS. 3, 4 and 5 is shown as an example of how the electrical energy induced at the coil arrangement 5 can be used. The electrical energy is used for the power supply of a load of the electropneumatic field device 1 of the exemplary embodiment, like a positioner, a position sensor, etc. Additionally or alternatively, it is possible to use the obtained electrical energy at least partially to provide the electrical exaltation energy for generating the compressed air pulse in the pneumatic pressure chamber 17. As represented in FIG. 3, the pressure chamber 17 may be connected to an electropneumatic valve as a pressure controller, having the reference numeral 41 in FIG. 3, for the purpose of generating a—in particular timed—pressure pulse in the pneumatic chamber 17. The valve may be designed as a 2/2-way valve or a 3/2-way valve, wherein in the case of a 3/2-way valve an exhaust air outlet 49 is provided. In this case the energy converter 1 may adopt a more simple structural form according to the embodiment in FIGS. 1 and 2 insofar as the supply and exhaust air passage 31 may be dispensed with since a timed pressurizing and venting of the pressure chamber 17 is realized by the electropneumatic valve 41. The electropneumatic valve 41 is connected to a compressed air source 44 capable of supplying a constant air pressure of, for example, 6 bar.

The electropneumatic valve 41 is driven by a controller 43, wherein the pressure pulse generated by the valve 41 and transmitted from the valve 41 to the pressure chamber 17 via the duct 45 is adjusted by a control variable transmitted from the control unit 43 to the electropneumatic valve 41 via the line 47 shown in FIG. 3. The control unit 43 has the function to provide electrical power for the valve 41 as well as a timed control pulse intended to generate a pressure pulse in the pressure chamber 17 so that the piston device 13' receives the respective force for its displacement relative to the coil arrangement 5. Therein, the controller 43 has the function to use the energy that is not used by a load (not represented), which load is powered by the extracted energy induced at the coil arrangement 5. The embodiment represented in FIG. 3 enables a significantly reduced energy consumption concerning the electrical part of the energy conversion device. The pneumatic energy, available in abundance, can be converted into electrical energy with a high efficiency.

In FIG. 5, a possible load system is connected to the coil arrangement 5 and generally given the reference numeral 51. It shall be understood that for a particular embodiment the load system 51 as well as the pressure pulse device as in FIG. 3 may be connected to the coil arrangement 5.

The load system 51 has a rectifier 53 that is directly connected to the coil arrangement 5 and converts the induced alternating current at the coil arrangement 5 into direct current. The design of the rectifier 53 is standard.

Downstream of the rectifier 53 is a circuit 55 connected for control of the induced electrical power with respect to a load represented by a load resistor 57 in FIG. 5.

The power control circuit 55 has a power meter device 61 as well as a current sensing resistor 63. Depending on how high the induced electrical energy is at the coil arrangement 5, a switch 65 is actuated by the power meter device 61, that is when the induced electrical energy is larger than the power required by the load 57. The excess energy is transmitted to a storage unit 67 connected downstream of the circuit that can be designed for example as a capacitor.

In case that no excess energy is present, the switch 65 is opened. The storage unit 67 can be suitable to power the load 57 as well as the electrical control unit 43.

In FIG. 4, a complete electropneumatic field device according to the exemplary embodiment is generally given the reference numeral 81 and comprises the above described energy converter 1 lodged in a closed housing 83. An electropneumatic positioner 85 that actuates a pneumatic actuator 87 may be attached to the outside of the housing 83 by means of a flange connection. In the example shown in FIG. 4, the pneumatic actuator 87 is realized as a lifting actuator. A rod arrangement fixed at a movable plate membrane arrangement is coupled with a valve member of the control valve 94 that adjusts a fluid stream in pipe 91 of an industrial processing installation, not shown in detail. A position sensor 93 is designed to transmit position signals to the positioner 85 and is designed as a mechanical sensor in FIG. 4.

The positioner 85 is connected to a pneumatic pressure source 95 of for example 6 bar. A filter is provided downstream of the pneumatic pressure source 95. A pressure controller provided as a pressure reducer 97 is disposed in the housing 83 of the energy converter 1, the pressure reducer receiving a pressure p1 and outputting a pressure p2 to the air supply duct 25 of the energy converter 1. The pressure reducer 97 has the function to adjust the output pressure p2 such that it is constant and essentially corresponds to the resonance frequency of the oscillating system of the piston glider 13. In the particular example the pressure p2 may be 1.5 bar.

A load system including an energy management functionality is connected to the coil arrangement management functionality and is thus connected to the coil arrangement 5, whereby an electrical load of the electromagnetic positioner 85 is provided with power.

The pressure reducer 97 has the function to initiate an oscillating to and fro movement of the piston glider 13 according to the pressurizing and venting of the compressed air pressure chamber 17 in order to generate a respective electrical energy at the coil arrangement 5.

The features disclosed in the above description, the figures and the claims may be relevant for the realization of the invention in its different embodiments individually as well as in any combination.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. An electropneumatic field device system for supply with pneumatic energy, comprising:
   a valve;
   a pneumatic actuator for receiving said pneumatic energy and connected to actuate the valve;
   an electropneumatic field controller controlling said pneumatic actuator by controlling said pneumatic energy to said pneumatic actuator;
   an energy converter for converting the pneumatic energy also supplied to the pneumatic actuator into electrical energy;
   said energy converter comprising
      an oscillating permanent magnet that receives a compressed air pulse to perform a forward motion,
      a return transmitting a return force to the oscillating permanent magnet resulting in a return motion opposite to the forward motion, an electrical voltage being induced in a coil of the energy converter by the forward and return motions of the oscillating permanent magnet,
      the return being designed to generate a magnetic field that is polarized with respect to the oscillating permanent magnet such that a magnetic repulsion return force induces the return motion; and
   a pressure controller for supplying said pneumatic energy to the energy converter.

2. The field device system according to claim 1 wherein the return comprises a stationary permanent magnet stationary with respect to the coil of the energy converter, and wherein equal poles of the oscillating permanent magnet and the stationary permanent magnet are assigned to each other and disposed opposite to each other.

3. The field device system according to claim 1 wherein the oscillating permanent magnet is attached to an actuating piston in a cavity of a housing of the energy converter for a translational forward and return motion so that the oscillating permanent magnet can plunge in and out of the coil, and wherein an air supply duct via which said pneumatic energy comprising compressed air can be administered for creation of the compressed air pulse is connected to a cylinder guide containing said actuating piston, and the cylinder guide defining a pneumatic pressure chamber that is hermetically sealed for generating the compressed air pulse, and which is also vented depending on a position of the oscillating permanent magnet.

4. The field device system according to claim 3 wherein said air supply duct can be blocked or cleared for generating the compressed air pulse along with an exhaust air duct built into the actuating piston.

5. The field device system according to claim 1 wherein said compressed air pulse is supplied into the pressure chamber by said pressure controller comprising an electropneumatic valve.

6. The field device system according to claim 1 wherein said pressure controller is provided as a pressure reducer and which is provided for administration of compressed air to keep supply pressure of the energy converter constant so that the oscillation of the piston is maintained.

7. The field device system according to claim 1 wherein the coil has an electrical contact for the induced electrical voltage and to which a power control circuit is connected to control a collected electrical power as a result of the induced electrical voltage to be dispensed to a user, the power control circuit being connected to an electrical storage, and the power control circuit loading excess electrical power into the storage device if generated electrical power exceeds consumption of a respective electrical load.

8. The field device system according to claim 7 wherein the power control circuit is preceded by a rectifier converting induced alternating current into a direct current.

9. The field device system according to claim 1 wherein an electrical control is connected to an electrical connection of the coil, the electrical control powering an electropneumatic valve as said pressure controller, said valve being in pneumatic connection with a pressure chamber of the energy converter, and the electrical control controlling the valve such that said compressed air pulse is created and operationally adjusted for the oscillating permanent magnet.

10. The field device system according to claim 1 wherein said compressed air pulse is generated by said pressure controller and is fed by said pressure controller through a supply duct to a pneumatic pressure chamber which performs said forward motion of said oscillating permanent magnet, or said compressed air pulse being generated by feeding said pneumatic energy to said pressure controller connected to a pressure chamber through an air supply duct, said pressure chamber having a supply and exhaust air passage which when aligned with said air supply duct allows compressed air to flow into said pressure chamber and which when aligned with a venting duct in a venting chamber housing containing said permanent magnet allows air to vent.

11. A method for providing an electrical power supply for a pneumatic field device system for supply with pneumatic energy, said field device system comprising a valve, a pneumatic actuator connected to actuate the valve, the pneumatic energy being supplied to the pneumatic actuator, and an electropneumatic field controller controlling said pneumatic actuator by controlling said pneumatic energy to said pneumatic actuator, comprising the steps of:

providing an energy converter for converting the pneumatic energy also supplied to the pneumatic actuator into electrical energy, said energy converter having an oscillating permanent magnet that receives a compressed air pulse to perform a forward motion, a return transmitting a return force to the oscillating permanent magnet resulting in a return motion opposite to the forward motion, and an electrical voltage being induced in a coil of the energy converter by the forward and return motions of the oscillating permanent magnet;

providing a pressure controller for supplying said pneumatic energy to the energy converter; and generating a magnetic field with said return that is polarized with respect to the oscillating permanent magnet such that a magnetic repulsion return force induces the return motion.

12. The method of claim 11 wherein said compressed air pulse is generated by said pressure controller and is fed by said pressure controller through a supply duct to a pneumatic pressure chamber which performs said forward motion of said oscillating permanent magnet, or said compressed air pulse being generated by feeding said pneumatic energy to said pressure controller connected to a pressure chamber through an air supply duct, said pressure chamber having a supply and exhaust air passage which when aligned with said air supply duct allows compressed air to flow into said pressure chamber and which when aligned with a venting duct in a venting chamber housing containing said permanent magnet allows air to vent.

* * * * *